United States Patent [19]

Hettich

[11] Patent Number: 4,810,127
[45] Date of Patent: Mar. 7, 1989

[54] FURNITURE MOUNTING

[76] Inventor: Anton Hettich, Schöne Aussicht, 4900 Herford, Fed. Rep. of Germany

[21] Appl. No.: 63,132
[22] PCT Filed: Sep. 24, 1986
[86] PCT No.: PCT/DE86/00390
§ 371 Date: Jun. 5, 1987
§ 102(e) Date: Jun. 5, 1987
[87] PCT Pub. No.: WO87/02102
PCT Pub. Date: Apr. 9, 1987

[30] Foreign Application Priority Data
Oct. 5, 1985 [DE] Fed. Rep. of Germany ....... 8528399

[51] Int. Cl.⁴ .............................................. B25G 3/00
[52] U.S. Cl. .................. 403/407.1; 403/231; 403/245
[58] Field of Search ............... 403/407.1, 231, 246, 403/245, 261, 405.1, 406.1, 264

[56] References Cited

U.S. PATENT DOCUMENTS 4,131,376 12/1978 Busse .................. 403/231 X

FOREIGN PATENT DOCUMENTS 543465 12/1955 Belgium ..................... 403/343
337997 11/1930 United Kingdom .......... 403/343

Primary Examiner—Andrew V. Kundrat
Attorney, Agent, or Firm—Michael J. Striker

[57] ABSTRACT

The rotating lock of a furniture mounting includes a locking head which engages a clamping part with its inner clamping cam in the mounted state. The rotating lock is inserted in a borehole of a furniture part. The inner clamping cam is provided with toothlike raised portions or recessed portions, and the circumferential surface of the rotating lock is at least partially provided with ribs or raised portions (5) whereby it is ensured that the loosening moment of the furniture mounting is increased in such a way that an unintended loosening is made substantially more difficult or is prevented.

29 Claims, 2 Drawing Sheets

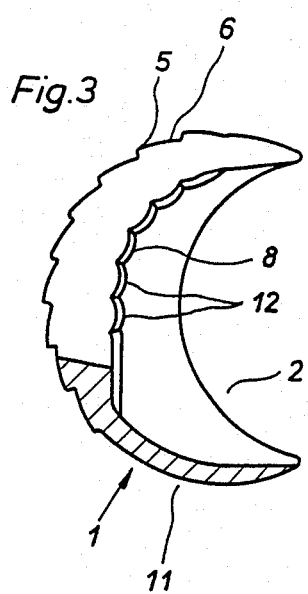
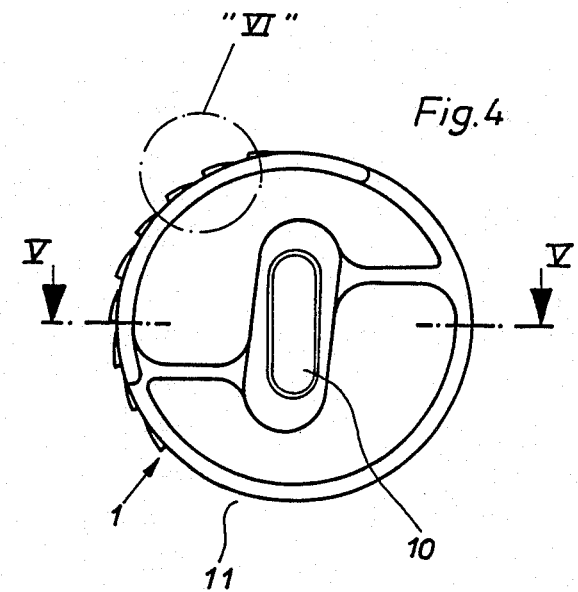
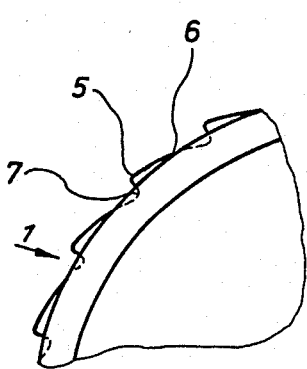
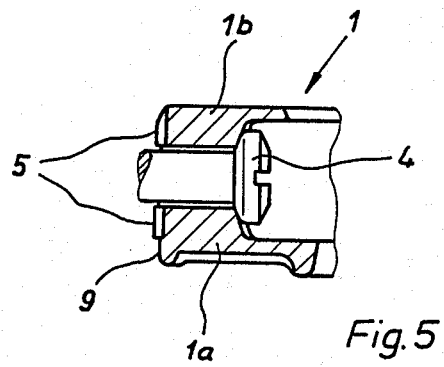
Fig. 3
Fig. 4
Fig. 5
Fig. 6

FURNITURE MOUNTING

BACKGROUND OF THE INVENTION

The invention relates to a mounting for connecting two furniture parts. Such a mounting is formed of a clamping part which can be fastened to a first furniture part and which comprises a locking head and a rotating lock which is insertable in a cylindrical recess of the second furniture part and is of a substantially cylindrical shape and has at least one approximately helically extending inner clamping cam which engages behind said locking head.

Mountings of this type are known per se.

However, the known mountings have the disadvantage that they can be loosened due to vibrations of the means of transport, which occur during transportion.

Attempts were made to prevent this disadvantage either by constructing the inner clamping cam in a wave-shaped manner so that a catching effect was brought about between the mounting parts or by providing saw-toothlike teeth on the outer surface of the rotating lock.

With the outer teeth, the entire restoring moment was exerted on the bearing surface; i.e., the occurring forces had to be removed from the outer surface of the rotating lock, wherein the saw-teeth worked into the work material of the furniture like a circular saw because of the occurring vibrations, so that the connection loosened.

The wave-shaped teeth on the inner clamping cam were also insufficient by themselves for preventing the undesired loosening of the connection.

SUMMARY OF THE INVENTION

The present invention has the object of avoiding the aforementioned disadvantages and improving a connecting mounting of the type mentioned about in such a way that the risk of unintended loosening, particularly during transportation, is reduced or prevented.

This object is met, according to the invention, in that the inner clamping cam has toothlike raised portions or recessed portions, and the circumferential surface of the rotating lock is provided at least partially with projections formed as ribs or raised portions.

The loosening moment can be increased in the mounting by means of simple and inexpensive steps in such a way that an unintended loosening is made substantially more difficult or is prevented.

Attempts with mountings in commercially available chip boards of medium quality with a uniform tightening moment of the rotating lock of 3 Nm, (Newtonmeter) for example, have resulted in the following: 1. If neither an inner clamping cam nor a rotating lock with toothlike raised portions/recessed portions are provided, the loosening moment of the rotating lock is between 1.0 and 1.4 Nm. The loosening moment is a turning moment which is required for loosening the mounting connection. 2. If the rotating lock is provided with toothlike raised portions/recessed portions, the loosening moment of the rotating lock is between 1.8 and 2.3 Nm. 3. If only the inner clamping cam is provided with tooth-like raised portions/recessed portions, the loosening moment is between 1.8 and 2.4 Nm. 4. If the inner clamping cam and circumferential surface of the rotating lock are provided with toothlike raised portions/recessed portions, the loosening moment is between 2.4 and 2.6 Nm.

As shown above, the loosening moment can be increased almost to the value of the tightening moment by means of the combination of toothlike raised portions/recessed portions on the inner clamping cam as well as on the circumferential surface of the rotating lock. The tightening moment is a turning moment which must be applied for the purpose of producing a proper connection of the mounting parts.

It has proven particularly advantageous to construct the ribs or raised portions on the circumferential surface of the rotating lock as saw-teeth, wherein the saw-teeth are directed opposite to the locking turning direction of the rotating lock, i.e. the saw-teeth oppose a greater resistance to the loosening turning direction of the rotating lock in that they dig into the work material of the furniture part with their tips in this turning direction.

Moreover, it has proven advantageous that the raised portions/recessed portions on the inner clamping cam are formed of approximately radial-shaped wave crests which are arranged in a row. This construction of the inner clamping cam permits the locking head to slide over the wave crests relatively easily during the clampig process, provides the intended catching effect in the final position, and thereby prevents the unwanted automatic loosening of the mounting, and also allows the mounting to be loosened again for the purpose of disassembling the furniture.

In order to meet certain requirements, which are made by customers, for example, with respect to the magnitude of the tightening or loosening moments, the shape of the projections/recessed portions on the inner clamping cam or the construction and arrangement of the ribs or raised portions on the circumferential surface of the rotating lock can be varied.

Thus, for example, the recessed portions at the inner clamping cam can also be formed as wave troughs which are constructed so as to be approximately radial-shaped and arranged in a row. The raised portions can also be formed as tips with straight, convex or concave flanks, or the raised portions can be constructed as saw-teeth.

The same applies to the ribs or raised portions in the shape of teeth, particularly saw-teeth, which are arranged on the circumferential surface of the rotating lock. Here, also, the flanks of the teeth can be constructed so as to be straight, concave or convex. Or they can be formed by means of radial-shaped recesses or can consist of individual nodular, possibly inclined projections.

In addition, the teeth can extend parallel to the rotating lock axis or can be inclined relative to the latter, for example, in a manner comparable to helical teeth or herringbone teeth. Helical teeth can bring it about that the rotating lock is drawn into the recess of the furniture piece which receives it, an effect which can be desired under certain circumstances.

The height of the ribs or projections can also be selected so as to vary, for example, in such a way that the ribs or projections which act first during the clamping of the mounting parts have a smaller height than those which act last, in order, if necessary, to gradually increase the forces necessary for tightening.

In addition, it is possible to keep the height of the ribs or projections in the area of the front faces of the rotating lock smaller than in the middle area in order to keep the surface area free of undesired deformations.

It can be advisable not to permit the ribs or projections on the circumferential surface of the rotating lock to project directly up to front face, but, rather, to have them end already before this, so that there is a circulating rim which is free of ribs or projections.

This circulating rim absorbs a portion of the occurring forces, on the one hand, and, on the other hand, ensures that the surface area of the furniture part is not deformed by means of the ribs or projections, particularly with respect to repeated intentional loosening of the mounting. A deformation in the surface area of the furniture part is undesirable because the surface, which consists, for example, of a plastic coating, veneer, lacquer, or the like, could tear, split or chip because of the deformation. This is to be avoided for reasons which are clear.

In this context, it is also advantageous that the ribs or projections on the circumferential surface of the rotating lock project forward, i.e. that they be arranged so as to be raised, so that the ribs or projections can work in to the work material of the furniture part.

In furniture work materials in which rubbed off material can develop, it can be advisable to provide a recessed hollow or recess, i.e. one which penetrates the circumferential surface of the rotating lock. The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Rubbed off material, e.g. from the chip board, which possibly occurs because of repeated loosening and tightening, can collect and be deposited in such a hollow or recess.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Figure 1:
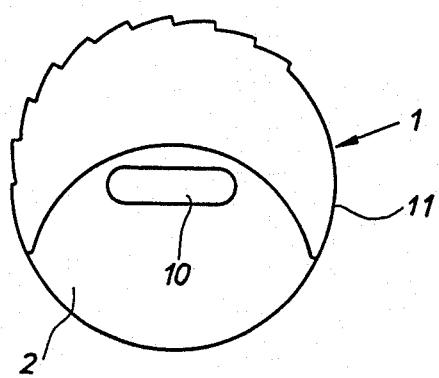
Figure 2:
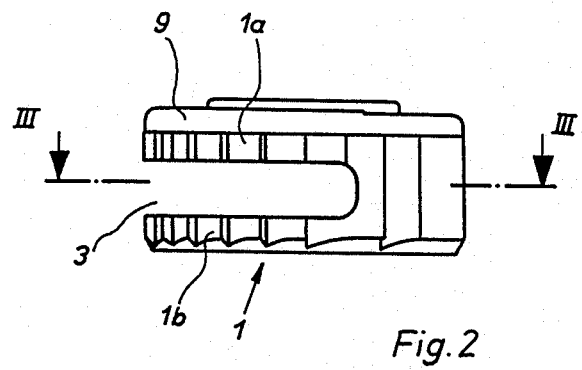

FIG. 1 shows a front view of a rotating lock;

FIG. 2 shows a side view of a rotating lock;

FIG. 3 shows a section along line III—III of FIG. 2, but is turned by 90° in the clockwise direction;

FIG. 4 shows a rear view of a rotating lock;

FIG. 5 shows a partial section along line V—V of FIG. 4 in cooperation with a locking part which is constructed as a cap screw; and FIG. 6 shows the enlarged detail which is designated by IV in FIG. 4.

DETAILED DESCRIPTION OF THE PREFERRED EMBODIMENTS

The rotating lock 1, which is shown in the drawings and is described in the following, is known per se. A locking head, which is constructed as a cap screw 4, is insertable through a recess 2 in the front side and through a slot 3 in the circumference side and is embraced by halves 1a, 1b of the rotating lock 1 in a known manner in the locking position (FIG. 5).

In the middle area, the rotating lock 1 has an opening 10 for applying a work tool.

At its circumferential surface 11, the rotating lock 1 preferably has saw-teeth 5 with radially or concavely curved flanks 6. The saw-teeth 5 are formed in such a way that they are directed in the opposite direction of the locking turning direction of the rotating lock 1, i.e. they offer greater resistance during the loosening of the rotating lock 1. The saw-teeth 5 on the circumferential surface 11 of the rotating lock 1 are raised, i.e. they are arranged so as to project outwardly. Of course, it can be advisable to provide a hollow or recess 7 at the base of each tooth 5, in which recess a rubbed off material, which can possibly occur, can collect and be deposited (FIG. 6).

The saw-teeth 5 are arranged so as to be located opposite the inner clamping cam 8 (FIG. 3). The saw-teeth 5 do not extend along the entire height of the rotating lock 1, but leave open an annular rim 9. The rim 9 is located in the area of the surface of the furniture part, not shown, and keep the surface area free of deformations.

As shown in FIG. 2, the teeth 5 formed on the circumferential area 11 of the turning lock halves 1a, 1b are located opposite each other. It is also conceivable that the teeth 5 be arranged so as to be offset in such a way that they would be not located opposite one another.

The inner clamping cam 8 is preferably provided with wavelike, radial-shaped projections 12. The inner clamping cam 8 can have a varying inclination in a known manner, e.g. a smaller inclination in the beginning area, a greater inclination in the end area, or vice versa.

The inclination of the projections 12 can be adapted to the screw head 4 in a known manner (FIG. 5).

During the clamping, i.e. when turning the rotating lock 1 in the clockwise direction, with reference to fig. 3, the screw head 4 slides over the wave-shaped projections 12 and comes to rest in the recess in the end position.

As mentioned, the saw-teeth 5 (FIG. 3) are arranged in such a way that they offer no resistance during this rotation in the clockwise direction, rather only during the loosening, i.e. during the rotation in the counter-clockwise direction, with reference to FIG. 3.

As stated above, there are numerous construction possibilities for constructing the teeth on the circumferential surface 11 and inner clamping cam 8—for example, in order to adapt to certain requirements—which differ from the embodiment example described above.

It will be understood that each of the elements described above, or two or more together, may also find a useful application in other types of furniture mountings differing from the types described above.

While the invention has been illustrated and described as embodied in a furniture mounting, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claim.

I claim:

1. In a mounting for connecting two furniture parts to each other, the mounting comprising a clamping part which is fastened to a first furniture part and includes a locking head, and a rotating lock which is insertable into a cylindrical recess of a second furniture part, said rotating lock being of a substantially cylindrical shape and having at least one inner clamping cam which engages said locking head, the improvement comprises that said inner clamping cam (8) is formed with tooth-like raised portions and recessed portions, (12), and a circumferential surface (11) of said rotating lock (1) is provided at least partially with projections (5).

2. Mounting according to claim 1, wherein said projections (5) extend parallel to an axis of the rotating lock.

3. Mounting according to claim 1, wherein said projections (5) project outwardly from said circumferential surface (11) of the rotating lock.

4. Mounting according to claim 1, wherein said projections (5) are provided only on a part of said circumferential surface (11) of said rotating lock (1) whereby an annular rim (9) is formed on said surface, which is free of projections.

5. Mounting according to claim 4, wherein said rim (9) is directed toward a side which is visible in an installed state of said rotating lock (1).

6. Mounting according to claim 1, wherein said projections (5) have the shape of saw-teeth (6).

7. Mounting according to claim 6, wherein said turning lock is turnable in two directions one of which is a direction of locking, said saw-teeth (5, 6) being directed in a direction opposite to the direction of locking of said rotating lock.

8. Mounting according to claim 1, wherein said projections are individual, inclined nodular projections.

9. Mounting according to claim 1, wherein said projections (5) are arranged on said circumferential surface in the area in which said inner clamping cam (8) is provided.

10. Mounting according to claim 1, said rotating lock having a lateral slot (3) said projections (5) being arranged so as to be located opposite one another at both sides of said slot (3).

11. Mounting according to claim 10, wherein said projections (5) are arranged so as to be offset relative to one another at both sides of said slot (3).

12. Mounting according to claim 1, wherein said projections (5) are formed as helical teeth.

13. Mounting according to claim 1, wherein said projections (5) are shaped as herringbone teeth.

14. Mounting according to claim 13, wherein said teeth have tooth flanks (6) which are curved concavely.

15. Mounting according to claim 13, said teeth have tooth flanks (6) which are curved convexly.

16. Mounting according to claim 13, a tooth flank of each tooth is a straight line which extends out in a radius at a base of each tooth.

17. Mounting according to claim 13, wherein said teeth are formed by radial-shaped recesses.

18. Mounting according to claim 11, wherein each tooth has a hollow recessed portion (7), which penetrates into said circumferential surface (11) of said rotating lock (1) and is formed at a base of each tooth.

19. Mounting according to claim 11, wherein the height of said projections increases toward a middle part of said rotating lock (1).

20. Mounting according to claim 11, wherein the height of said projections (5, 8) is smaller in a beginning area of the teeth than in an end area thereof.

21. Mounting according to claim 1, wherein said raised portions (12) of said inner clamping cam (8) are approximately radial-shaped wave crests which are arranged in a row.

22. Mounting according to claim 1, wherein said recessed portions of said inner clamping cam (8) are wave troughs which are approximately radial-shaped and arranged in a row.

23. Mounting according to claim 1, wherein said raised portions (12) of said inner clamping cam (8) are tips with straight flanks.

24. Mounting according to claim 1, wherein said raised portions (12) of said inner clamping cam (8) are tips with convex flanks.

25. Mounting according to claim 1, wherein said raised portions (12) of said inner clamping cam (8) are tips with concave flanks.

26. Mounting according to claim 1, wherein said raised portions (12) of said inner clamping cam (8) are formed as saw-teeth.

27. Mounting according to claim 2, wherein said at least ribs and raised portions (5) project outwardly from said circumferential surface (11) of the rotating lock.

28. Mounting according to claim 1, wherein said projections (5) which are provided on the circumferential surface (11) of said rotating lock (1) are formed as ribs.

29. Mounting according to claim 1, wherein said projections (5) which are provided on the circumferential surface (11) of said rotating lock (1) are formed as raised portions

* * * * *